(12) United States Patent
Hart et al.

(10) Patent No.: US 8,814,743 B2
(45) Date of Patent: Aug. 26, 2014

(54) SYNCHRONIZING DISCONNECT DEVICE

(71) Applicant: GM Global Technology Operations LLC, Detroit, MI (US)

(72) Inventors: James M. Hart, Belleville, MI (US); Daryl A. Wilton, Macomb, MI (US); Clinton E. Carey, Highland, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 40 days.

(21) Appl. No.: 13/680,881

(22) Filed: Nov. 19, 2012

(65) Prior Publication Data
US 2014/0141925 A1   May 22, 2014

(51) Int. Cl.
*F16H 3/62* (2006.01)
*F16H 3/44* (2006.01)

(52) U.S. Cl.
CPC .................................. *F16H 3/62* (2013.01)
USPC .......................................... 475/275; 475/303

(58) Field of Classification Search
USPC ................... 475/275–292, 303, 329, 330
See application file for complete search history.

(56) References Cited

U.S. PATENT DOCUMENTS

| | | | |
|---|---|---|---|
| 2,936,864 A * | 5/1960 | Schjolin et al. ................. 477/59 |
| 6,176,803 B1 | 1/2001 | Meyer et al. | |
| 6,342,026 B1 | 1/2002 | Takagi et al. | |
| 6,547,688 B2 | 4/2003 | Takagi et al. | |
| 6,558,287 B2 | 5/2003 | Hayabuchi et al. | |
| 6,634,980 B1 | 10/2003 | Ziemer | |
| 6,663,528 B1 | 12/2003 | Haka | |
| 6,736,751 B1 | 5/2004 | Usoro et al. | |
| 6,743,139 B1 | 6/2004 | Usoro et al. | |
| 6,743,140 B1 | 6/2004 | Lee et al. | |
| 6,743,142 B1 | 6/2004 | Lee et al. | |
| 6,743,143 B1 | 6/2004 | Usoro et al. | |
| 6,743,144 B1 | 6/2004 | Lee et al. | |
| 6,746,357 B1 | 6/2004 | Usoro et al. | |
| 6,752,736 B1 | 6/2004 | Lee et al. | |
| 6,755,765 B2 | 6/2004 | Usoro et al. | |
| 6,758,784 B2 | 7/2004 | Lee et al. | |
| 6,758,787 B2 | 7/2004 | Usoro et al. | |
| 6,764,424 B1 | 7/2004 | Usoro et al. | |
| 6,764,425 B2 | 7/2004 | Lee et al. | |
| 6,764,426 B2 | 7/2004 | Usoro et al. | |
| 6,767,307 B1 | 7/2004 | Lee et al. | |
| 6,802,795 B2 | 10/2004 | Miyazaki et al. | |
| 6,811,512 B2 | 11/2004 | Usoro et al. | |

(Continued)

FOREIGN PATENT DOCUMENTS

WO   WO 2009077363 A1 *  6/2009

OTHER PUBLICATIONS

Pending U.S. Appl. No. 13/206,862, filed Aug. 10, 2011, by Mellet et al. All pages.

(Continued)

*Primary Examiner* — Tisha Lewis

(57) ABSTRACT

A transmission includes an input member, an output member, a set of four planetary gear sets each having first, second, and third members, a plurality of torque transmitting mechanisms each selectively engageable to interconnect at least one of the first, second, and third members with at least one other of the first, second, third members and a stationary member, and a synchronizer assembly that selectively connects and disconnects one member of one of the planetary gear sets.

17 Claims, 3 Drawing Sheets

(56) References Cited

U.S. PATENT DOCUMENTS

| | | | |
|---|---|---|---|
| 6,837,823 B2 | 1/2005 | Lee et al. | |
| 6,852,059 B2 | 2/2005 | Lee et al. | |
| 6,955,627 B2 * | 10/2005 | Thomas et al. | 475/283 |
| 6,960,149 B2 | 11/2005 | Ziemer | |
| 6,984,187 B2 | 1/2006 | Biermann | |
| 6,991,578 B2 | 1/2006 | Ziemer | |
| 7,011,597 B2 | 3/2006 | Haka | |
| 7,014,589 B2 | 3/2006 | Stevenson | |
| 7,018,319 B2 | 3/2006 | Ziemer | |
| 7,101,305 B2 | 9/2006 | Tabata et al. | |
| 7,128,683 B2 | 10/2006 | Oguri et al. | |
| 7,163,484 B2 | 1/2007 | Klemen | |
| 8,113,977 B2 * | 2/2012 | Phillips | 475/210 |
| 8,388,488 B2 * | 3/2013 | Phillips et al. | 475/280 |
| 8,465,390 B2 * | 6/2013 | Brehmer et al. | 475/282 |
| 8,512,196 B2 * | 8/2013 | Mellet et al. | 475/275 |
| 8,574,114 B2 * | 11/2013 | Brehmer et al. | 475/282 |
| 2005/0090362 A1 | 4/2005 | Abe et al. | |
| 2006/0019791 A1 | 1/2006 | Baldwin | |
| 2006/0270513 A1 | 11/2006 | Klemen | |
| 2006/0270514 A1 | 11/2006 | Oguri et al. | |
| 2006/0270516 A1 | 11/2006 | Klemen | |
| 2014/0038764 A1 * | 2/2014 | Goleski | 475/275 |

OTHER PUBLICATIONS

Pending U.S. Appl. No. 13/679,352, filed Nov. 16, 2012, by Singh. All pages.

Pending U.S. Appl. No. 13/488,017, filed Jun. 4, 2012, by Singh. All pages.

* cited by examiner

| Gear State | Gear Ratio | Gear Step | Torque Transmitting Elements ||||||
|---|---|---|---|---|---|---|---|---|
| | | | 32 | 30 | 34 | 36 | 28 | 26 |
| Rev | -2.943 | | X | | | | | X |
| N | | -0.64 | | | | | | |
| 1st | 4.564 | | X | | X | | | |
| 2nd | 2.964 | 1.55 | | X | X | | | |
| 3rd | 1.912 | 1.55 | | | X | | | X |
| 4th | 1.446 | 1.32 | | | X | | X | |
| 5th | 1.000 | 1.45 | | | | | X | X |
| 6th | 0.925 | 1.08 | X | | | X | | |
| 7th | 0.746 | 1.24 | | X | | | X | |
| 8th | 0.643 | 1.16 | | | | X | X | |
| 9th | 0.598 | 1.08 | | X | | X | | |
| 10th | 0.538 | 1.11 | | | | X | | X |

Overall Ratio    8.52           X - On, Carrying Torque

*Fig-4*

SYNCHRONIZING DISCONNECT DEVICE

FIELD

The present invention relates to torque transmitting devices. More specifically, the present invention relates to a synchronizing disconnect device for torque transmitting devices.

BACKGROUND

The statements in this section merely provide background information related to the present disclosure and may or may not constitute prior art.

Modern multiple speed transmissions commonly employ a plurality of planetary gear sets having sun gears, planet gear carriers and ring gears which are permanently coupled together or selectively interconnected by clutches or grounded by brakes to achieve reverse gear and a plurality of forward gear ratios.

While the foregoing described components provide the fundamental and necessary reverse and forward speeds or gear ratios, transmissions must also include control devices and components which select the desired or required gear ratio and facilitate shifts. In particular, transmissions may include devices that minimize spinloss during certain clutch conditions.

Accordingly, the present invention is directed to a synchronizer disconnect device which provides reduced spinloss for a released clutch.

SUMMARY

A transmission includes an input member, an output member, a set of four planetary gear sets each having first, second, and third members, a plurality of torque transmitting mechanisms each selectively engageable to interconnect at least one of the first, second, and third members with at least one other of the first, second, third members and a stationary member, and a synchronizer assembly that selectively connects and disconnects one member of one of the planetary gear sets.

The plurality of torque transmitting mechanisms are selectively engageable in combinations of at least two to establish at least ten forward speed ratios and at least one reverse speed ratio between the input member and the output member.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings:

FIG. 4 is a truth table presenting the state of engagement of the various torque transmitting elements in each of the available forward and reverse speeds or gear ratios of the transmissions illustrated in FIGS. 1-3.

DETAILED DESCRIPTION

The following description is merely exemplary in nature and is not intended to limit the present disclosure, application, or uses.

At the outset, it should be appreciated that the embodiments of the transmissions of the present invention have an arrangement of permanent mechanical connections between the elements of four planetary gear sets. A first component or element of a first planetary gear set is permanently coupled to a second component or element of the second planetary gear set. A second component or element of the first planetary gear set is permanently coupled a third component or element of the third planetary gear set. A third component or element of the first planetary gear set is permanently coupled to a third component or element of the fourth planetary gear set. A first component or element of a second planetary gear set is permanently coupled to a second component or element of the fourth planetary gear set. A third component or element of the second planetary gear set is permanently coupled to a second component or element of the third planetary gear set.

Figure 1:
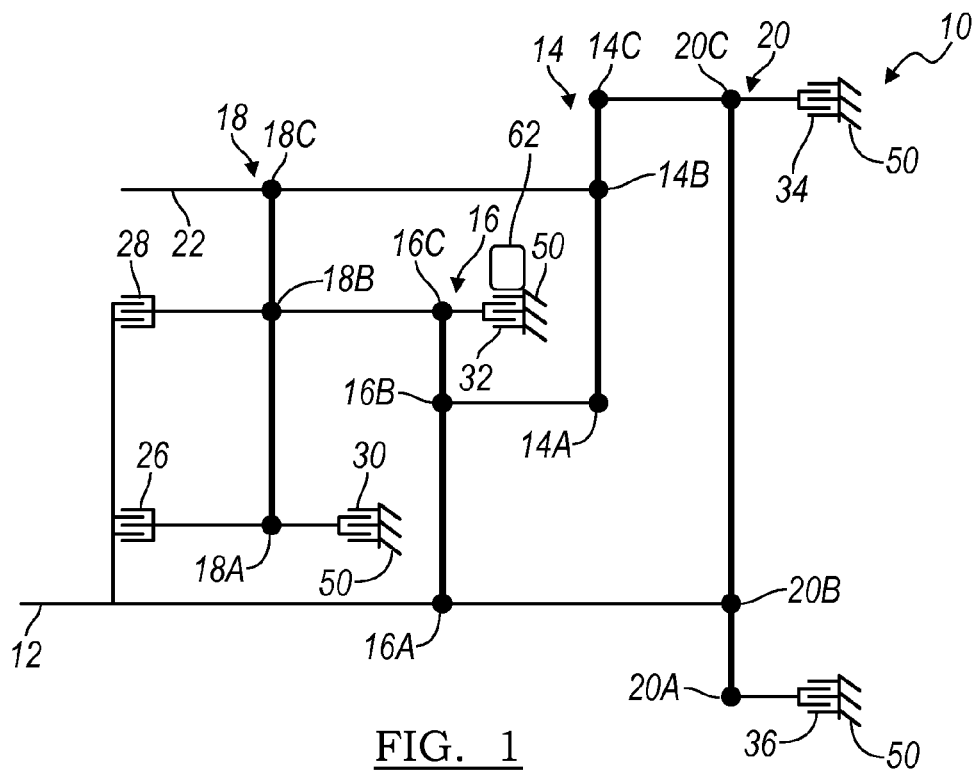
FIG. 1 is a lever diagram of a transmission which incorporates a synchronizing disconnect device in accordance with the principles of the present invention.

Referring now to FIG. 1, an embodiment of a ten speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and a fourth planetary gear set 20 and an output shaft or member 22. In the lever diagram of FIG. 1, the first planetary gear set 14 has three nodes: a first node 14A, a second node 14B and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the first node 16A of the second planetary gear set 16 and the second node 20B of the fourth planetary gear set 20. The output member 22 is coupled to the third node 18C of the third planetary gear set 18 and the second node 14B of the first planetary gear set 14. The first node 14A of the first planetary gear set 14 is coupled to the second node 16B of the second planetary gear set 16. The second node 14B of the first planetary gear set 14 is coupled to the third node 18C of the third planetary gear set 18. The third node 14C of the first planetary gear set 14 is coupled to the third node 20C of the fourth planetary gear set 20. The third node 16C of the second planetary gear set 16 is coupled to second node 18B of the third planetary gear set 18.

A first clutch 26 selectively connects the input member or shaft 12, the first node 16A of the second planetary gear set 16 and the second node 20B of the fourth planetary gear set 20 with the first node 18A of the third planetary gear set 18. A second clutch 28 selectively connects the input member or shaft 12, the first node 16A of the second planetary gear set 16 and the second node 20B of the fourth planetary gear set 20 with the second node 18B of the third planetary gear set 18. A first brake 30 selectively connects the first node 18A of the third planetary gear set 18 with a stationary member or transmission housing 50. A second brake 32 in association with a synchronizer assembly 62 (to be described in detail below) selectively connects the third node 16C of the second planetary gear set 16 and the second node 18B of the third planetary gear set 18 with the stationary member or transmission housing 50. A third brake 34 selectively connects the third node 14C of the first planetary gear set 14 and the third node 20C of the fourth planetary gear set 20 with the stationary member or transmission housing 50. A fourth brake 36 selectively connects the first node 20A of the fourth planetary gear set 20 with the stationary member or transmission housing 50.

Figure 2:
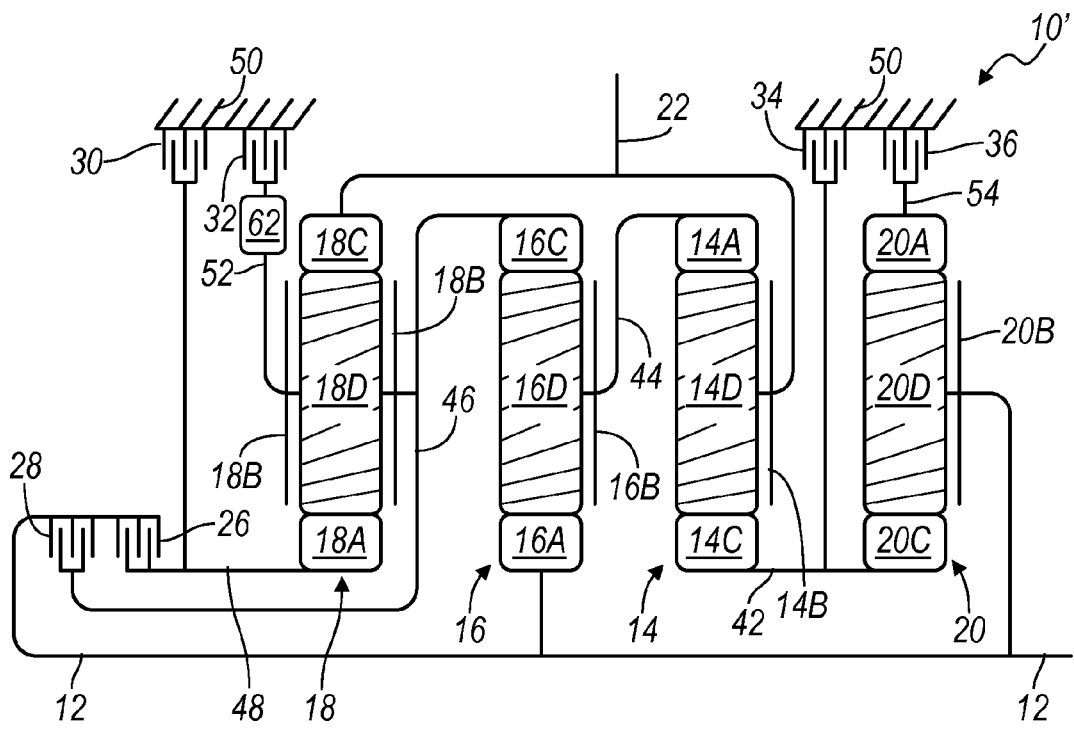
FIG. 2 is a diagrammatic illustration of the transmission of FIG. 1.

Referring now to FIG. 2, a stick diagram presents a schematic layout of an embodiment of the ten speed transmission 10' according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14C, a ring gear member 14A and a planet gear carrier member 14B that rotatably supports a set of planet gears 14D. The sun gear member 14C is connected for common rotation with a first shaft or interconnecting member 42. The ring gear member 14A is connected for common rotation with a second shaft or interconnecting member 44. The planet carrier member 14B is connected for common rotation with the output shaft or member 22. The planet gears 14D are each configured to intermesh with both the sun gear member 14C and the ring gear member 14A.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with the input shaft or member 12. The ring gear member 16C is connected for common rotation with a third shaft or interconnecting member 46. The planet carrier member 16B is connected for common rotation with the second shaft or interconnecting member 44. The planet gears 16D are each configured to intermesh with both the sun gear member 16A and the ring gear member 16C.

The planetary gear set 18 includes a sun gear member 18A, a ring gear member 18C and a planet gear carrier member 18B that rotatably supports a set of planet gears 18D. The sun gear member 18A is connected for common rotation with a fourth shaft or interconnecting member 48. The ring gear member 18C is connected for common rotation with the output shaft or member 22. The planet carrier member 18B is connected for common rotation with the third shaft or interconnecting member 46 and a fifth shaft or interconnecting member 52. The planet gears 18D are each configured to intermesh with both the sun gear member 18A and the ring gear member 18C.

The planetary gear set 20 includes a sun gear member 20C, a ring gear member 20A and a planet gear carrier member 20B that rotatably supports a set of planet gears 20D. The sun gear member 20C is connected for common rotation with the first shaft or interconnecting member 42. The ring gear member 20A is connected for common rotation with a sixth shaft or interconnecting member 54. The planet carrier member 20B is connected for common rotation with the input shaft or member 12. The planet gears 20D are each configured to intermesh with both the sun gear member 20C and the ring gear member 20A.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28 and brakes 30, 32, 34 and 36 allow for selective interconnection of the shafts or interconnecting members, members of the planetary gear sets and the housing. For example, the first clutch 26 is selectively engageable to connect the input shaft or member 12 with the fourth shaft or interconnecting member 48. The second clutch 28 is selectively engageable to connect the input shaft or member 12 with the third shaft or interconnecting member 46. The first brake 30 is selectively engageable to connect the fourth shaft or interconnecting member 48 with the stationary element or the transmission housing 50 in order to restrict the member 48 from rotating relative to the transmission housing 50. The second brake 32 in association with the synchronizer assembly 62 is selectively engageable to connect the fifth shaft or interconnecting member 52 with the stationary element or the transmission housing 50 in order to restrict the member 52 from rotating relative to the transmission housing 50. The third brake 34 is selectively engageable to connect the first shaft or interconnecting member 42 with the stationary element or the transmission housing 50 in order to restrict the member 42 from rotating relative to the transmission housing 50. The fourth brake 36 is selectively engageable to connect the sixth shaft or interconnecting member 54 with the stationary element or the transmission housing 50 in order to restrict the member 54 from rotating relative to the transmission housing 50.

Figure 3:
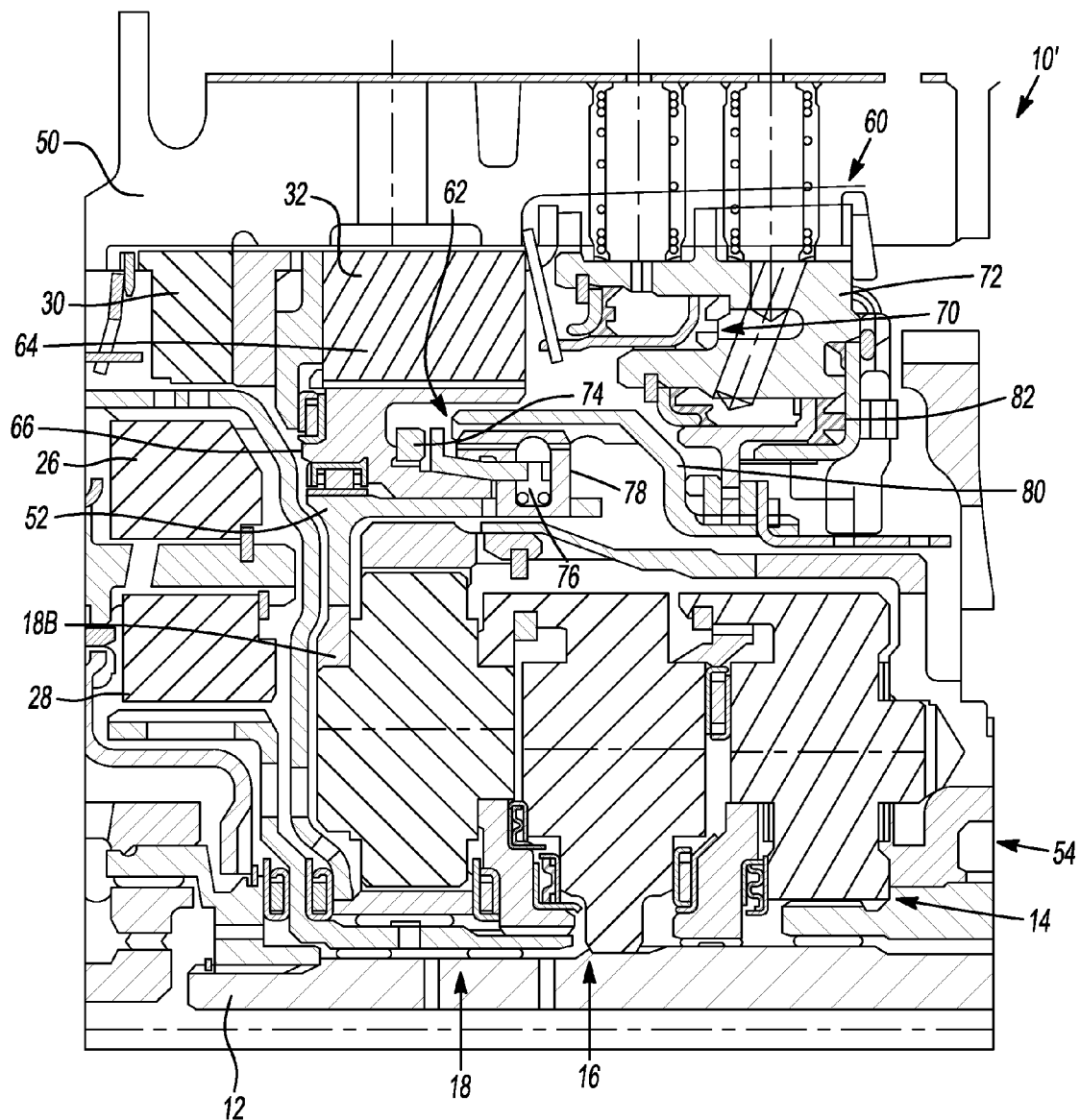
FIG. 3 is a fragmentary, sectional view of a multiple speed transmission with the synchronizing disconnect device in accordance with the principles of the present invention.

With reference to FIG. 3, a partial view of a particular implementation of the transmission 10' for a motor vehicle powertrain is shown. The powertrain includes an engine that may be a conventional internal combustion engine or an electric engine, or any other type of prime mover, without departing from the scope of the present disclosure. In addition, additional components, such as hydrodynamic fluid driving devices such as torque converters and fluid couplings, may be disposed between the engine and the transmission 10' without departing from the scope of the present disclosure.

The transmission 10' includes a typically cast, metal housing such as the housing 50 which encloses and protects the various components of the transmission 10'. The housing 50 includes a variety of apertures, passageways, shoulders and flanges which position and support these components. The transmission 10' includes a gear and clutch arrangement 54.

The gear and clutch arrangement 54 includes a plurality of gear sets and a plurality of shafts. The plurality of gear sets may include individual intermeshing gears, such as planetary gear sets, that are connected to or selectively connectable to the plurality of shafts. The plurality of shafts may include layshafts or countershafts, sleeve and center shafts, reverse or idle shafts, or combinations thereof. It should be appreciated that the specific arrangement and number of the gear sets and the specific arrangement and number of the shafts within the transmission 10' may vary without departing from the scope of the present disclosure.

In the particular arrangement of the transmission 10' shown in FIG. 3, among the various components of the transmission 10' are the first planetary gear assembly 14, the second planetary gear assembly 16, and the third planetary gear assembly 18 which are concentrically disposed about the input shaft 12 (the fourth planetary gear assembly 20 is not shown). A clutch assembly 60 includes a clutch piston 70 in a housing 72. The clutch assembly 60 selectively couples a set of clutch plates 64, attached to a rotatable hub 66, to the housing 50. Specifically, as the clutch piston 70 translates towards the set of clutch plates 64, the second brake 32 engages the fifth shaft or interconnecting member 52 with the housing 50 in order to restrict the member 52 from rotating relative to the transmission housing 50.

The synchronizer assembly 62 according to the present invention is operably disposed between the planet gear carrier member 18B and the second brake 32. Hence, the synchronizer assembly operates as a connect/disconnect mechanism between the second brake 32 and the planet gear carrier member 18B. The synchronizer assembly 62 includes a synchronizer cone 76 coupled to a synchronizer hub 78, which, in turn, is coupled to a synchronizer sleeve 80. Note that a synchronizer dog ring 74 is attached, for example, by welding, to the hub 66. The synchronizer assembly 62 further includes a non-rotating synchronizer piston 82 that is coupled to a rotating synchronizer sleeve 80. Translation of the synchronizer piston 82 selectively engages synchronizer cone 76 with the hub 66 and synchronizer sleeve 80 with synchronizer dog ring 74.

To engage the brake 32 with the planet gear carrier member 18B, the synchronizer piston 82 translates towards the hub 66. The translation of the piston 82 moves the synchronizer sleeve 80, and hence the synchronizer cone 76 towards the hub 66 as well. As the synchronizer cone 76 moves towards the hub 66, the frictional contact between the synchronizer cone 76 and the hub 66 increases until synchronizer sleeve 80 connected to the planet carrier member 18B matches the speed of the hub 66. Full engagement between the brake 32 and the planet gear carrier member 18B occurs when the synchronizer sleeve 80 translates past synchronizer cone 76 and makes contact with the synchronizer dog ring 74.

To decouple or disconnect the brake 32 from the planet gear carrier member 18B, the synchronizer piston 82 translates away from the hub 66. Consequently, the synchronizer sleeve 80, and the synchronizer cone 76 translate away from the hub 66 as well, which reduces and ultimately eliminates the engagement between the synchronizer sleeve 80 and the hub 66. The synchronizer assembly 62 capitalizes on the ability of powertrain control systems to allow for a selectable connection to be made between planet gear carrier member 18B and clutch hub 66. Planet gear carrier member 18B and clutch hub 66 are connected before second brake 32 is applied and disconnected after brake 32 is released. When disconnected, the spinloss from open brake 32 is negligible as the relative slip speed between transmission housing 50 and planet gear carrier member 18B is at cone 76, which results in lower spinloss.

Referring now to FIGS. 2 through 4, the operation of the embodiment of the ten speed transmission 10' will be described. It will be appreciated that transmission 10' is capable of transmitting torque from the input shaft or member 12 to the output shaft or member 22 in at ten forward speed torque ratios and at least one reverse speed or torque ratio. Each forward and reverse speed or torque ratio is attained by engagement of one or more of the torque-transmitting mechanisms (i.e. first clutch 26, second clutch 28, first brake 30, second brake 32, third brake 34 and fourth brake 36), as will be explained below. FIG. 4 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 10'. Of course, other gear ratios are achievable depending on the gear diameter, gear teeth count and gear configuration selected.

For example to establish a reverse gear, first clutch 26 and second brake 32 are engaged or activated. The first clutch 26 connects the input shaft or member 12 with the fourth shaft or interconnecting member 48. The second brake 32 in association with the synchronizer assembly 62 connects the fifth shaft or interconnecting member 52 with the stationary element or the transmission housing 50 in order to restrict the member 52 from rotating relative to the transmission housing 50. Likewise, the ten forward ratios are achieved through different combinations of clutch and brake engagement, as shown in FIG. 4. For example, the engagement of the brake 32 in association with the synchronizer assembly 62 is also employed to establish a first and a sixth gear, when the brake 34 and the brake 36 are engaged, respectively. Synchronizer assembly 62 is engaged prior to engagement of brake 32 and synchronizer assembly 62 is disengaged after release of brake 32.

It will be appreciated that the foregoing explanation of operation and gear states of the ten speed transmission 10' assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:
1. A transmission comprising:
an input member;
an output member;
first, second, third and fourth planetary gear sets concentrically disposed about the input member, each planetary gear set having first, second and third members;
six torque transmitting mechanisms each selectively engageable to interconnect at least one of the first, second, and third members with at least one other of the first, second, third members and a stationary member;

a synchronizer assembly that selectively connects and disconnects one member of one of the planetary gear sets, the synchronizer assembly including a synchronizer piston that actuates the synchronizer assembly, the synchronizer assembly further including a synchronizer sleeve, a synchronizer cone, and a synchronizer hub coupled to the synchronizer sleeve and the synchronizer cone, the synchronizer piston applying a force to the synchronizer sleeve such that the synchronizer cone engages with a hub associated with the one member of one of the planetary gear sets to synchronize speeds, and wherein the six torque transmitting mechanisms are selectively engageable in combinations of at least two to establish at least ten forward speed ratios and at least one reverse speed ratio between the input member and the output member.

2. The transmission of claim 1 wherein the synchronizer assembly incudes a dog ring coupled to the hub, and wherein the synchronizer sleeve fully engages the hub when the sleeve engages the dog ring.

3. The transmission of claim 1 wherein a first of the six torque transmitting mechanisms is selectively engageable to interconnect the first member of the third planetary gear set with the input member, the first member of the second planetary gear set and the second member of the fourth planetary gear set.

4. The transmission of claim 3 wherein a second of the six torque transmitting mechanisms is selectively engageable to interconnect the third member of the second planetary gear set and the second member of the third planetary gear set with the input member, the first member of the second planetary gear set and the second member of the fourth planetary gear set.

5. The transmission of claim 4 wherein a third of the six torque transmitting mechanisms is selectively engageable to interconnect the first member of the third planetary gear set with the stationary member.

6. The transmission of claim 5 wherein a fourth of the six torque transmitting mechanisms is selectively engageable to interconnect the second member of the third planetary gear set and the third member of the second planetary gear set with the stationary member.

7. The transmission of claim 6 wherein a fifth of the six torque transmitting mechanisms is selectively engageable to interconnect the third member of the first planetary gear set and the third member of the fourth planetary gear set with the stationary member.

8. The transmission of claim 7 wherein a sixth of the six torque transmitting mechanisms is selectively engageable to interconnect the first member of the fourth planetary gear set with the stationary member.

9. The transmission of claim 1 wherein the input member is continuously connected for common rotation with the first member of the second planetary gear set and the second member of the fourth planetary gear set.

10. The transmission of claim 1 wherein the third member of the first planetary gear set, the third member of the fourth planetary gear set, the first member of the second planetary gear set and the first member of the third planetary gear set are sun gears, the second members of the first, second, third and fourth planetary gear sets are carrier members and the first member of the first planetary gear set, the first member of the fourth planetary gear set, the third member of the second planetary gear set and the third member of the third planetary gear set are ring gears.

11. A transmission comprising:
an input member;
an output member;
first, second, third and fourth planetary gear sets each having first, second and third members, wherein the third member of the second planetary gear set rotatable supports a set of planet gears;
a first interconnecting member continuously interconnecting the first member of the first planetary gear set with the second member of the second planetary gear set;
a second interconnecting member continuously interconnecting the second member of the first planetary gear set with the third member of the third planetary gear set;
a third interconnecting member continuously interconnecting the third member of the first planetary gear set with the third member of the fourth planetary gear set;
a fourth interconnecting member continuously interconnecting the first member of the second planetary gear set with the second member of the fourth planetary gear set;
a fifth interconnecting member continuously interconnecting the third member of the second planetary gear set with the second member of the third planetary gear set; and
six torque transmitting mechanisms each selectively engageable to interconnect at least one of the first, second, and third members with at least one other of the first, second, third members and a stationary member;
a synchronizer assembly that selectively connects and disconnects one member of one of the planetary gear sets, and
wherein the six torque transmitting mechanisms are selectively engageable in combinations of at least two to establish at least ten forward speed ratios and at least one reverse speed ratio between the input member and the output member.

12. The transmission of claim 11 wherein the synchronizer assembly includes a synchronizer piston that actuates the synchronizer assembly.

13. The transmission of claim 12 wherein the synchronizer assembly includes a synchronizer sleeve, synchronizer cone, and a synchronizer hub coupled to the synchronizer sleeve and the synchronizer cone, wherein the synchronizer piston applies a force to the synchronizer sleeve such that the synchronizer cone and sleeve the one member of one of the planetary gear sets with the hub associated with one torque transmitting mechanism.

14. The transmission of claim 13 wherein the synchronizer assembly incudes a dog ring coupled to the hub, and wherein the synchronizer sleeve fully engages the dog ring after the cone engages the hub.

15. The transmission of claim 11 wherein the input member is continuously connected for common rotation with the first member of the second planetary gear set and the second member of the fourth planetary gear set.

16. The transmission of claim 11 wherein the output member is continuously connected for common rotation with the second member of the first planetary gear set and to third member of the third planetary gear set.

17. The transmission of claim 11 wherein the third member of the first planetary gear set, the third member of the fourth planetary gear set, the first member of the second planetary gear set and the first member of the third planetary gear set are sun gears, the second members of the first, second, third and fourth planetary gear sets are carrier members and the first member of the first planetary gear set, the first member of the fourth planetary gear set, the third member of the second planetary gear set and the third member of the third planetary gear set are ring gears.

* * * * *